United States Patent
Pegna et al.

(10) Patent No.: US 10,033,752 B2
(45) Date of Patent: Jul. 24, 2018

(54) SYSTEM FOR IMPLEMENTING THREAT DETECTION USING DAILY NETWORK TRAFFIC COMMUNITY OUTLIERS

(71) Applicant: Vectra Networks, Inc., San Jose, CA (US)

(72) Inventors: David Lopes Pegna, San Carlos, CA (US); Himanshu Mhatre, Mountain View, CA (US); Oliver Brdiczka, Mountain View, CA (US)

(73) Assignee: Vectra Networks, Inc., San Jose, CA (US)

( * ) Notice: Subject to any disclaimer, the term of this patent is extended or adjusted under 35 U.S.C. 154(b) by 0 days.

(21) Appl. No.: 14/930,583

(22) Filed: Nov. 2, 2015

(65) Prior Publication Data

US 2016/0191560 A1 Jun. 30, 2016

Related U.S. Application Data

(60) Provisional application No. 62/074,560, filed on Nov. 3, 2014.

(51) Int. Cl.
*H04L 29/06* (2006.01)
*G06F 21/55* (2013.01)

(52) U.S. Cl.
CPC ........ *H04L 63/1425* (2013.01); *G06F 21/552* (2013.01); *H04L 63/1416* (2013.01)

(58) Field of Classification Search
CPC .............. G06F 21/552; H04L 63/1425; H04L 63/1433; H04L 63/1416
USPC ........................................................ 726/23
See application file for complete search history.

(56) References Cited

U.S. PATENT DOCUMENTS

| | | | |
|---|---|---|---|
| 8,762,298 B1 * | 6/2014 | Ranjan | G06N 5/02 706/12 |
| 8,826,430 B2 | 9/2014 | Brdiczka et al. | |
| 8,880,530 B2 | 11/2014 | Brdiczka et al. | |
| 8,983,826 B2 | 3/2015 | Brdiczka et al. | |
| 9,002,370 B2 | 4/2015 | Brdiczka et al. | |
| 9,509,794 B2 | 11/2016 | Hussain et al. | |
| 2003/0236652 A1 | 12/2003 | Scherrer et al. | |
| 2007/0064617 A1 | 3/2007 | Reves | |
| 2010/0274744 A1 | 10/2010 | Brdiczka et al. | |
| 2011/0125547 A1 | 5/2011 | Brdiczka et al. | |
| 2011/0125679 A1 | 5/2011 | Brdiczka | |
| 2011/0126050 A1 | 5/2011 | Begole et al. | |
| 2011/0219315 A1 | 9/2011 | Bier et al. | |
| 2011/0258181 A1 | 10/2011 | Brdiczka et al. | |
| 2011/0258193 A1 | 10/2011 | Brdiczka et al. | |

(Continued)

FOREIGN PATENT DOCUMENTS

| | | |
|---|---|---|
| EP | 2385471 A1 | 11/2011 |
| EP | 2908495 A1 | 8/2015 |

OTHER PUBLICATIONS

International Search Report and Written Opinion dated May 11, 2016 for PCT Appln. No. PCT/US15/58676.

(Continued)

*Primary Examiner* — Yogesh Paliwal
(74) *Attorney, Agent, or Firm* — Vista IP Law Group, LLP

(57) ABSTRACT

A method and system for identifying insider threats within an organization is provided. The approach constructs an internal connectivity graph to identify communities of hosts/users, and checks for abnormal behavior relative to past behaviors.

30 Claims, 11 Drawing Sheets

(56) References Cited

U.S. PATENT DOCUMENTS

| | | |
|---|---|---|
| 2011/0302169 A1 | 12/2011 | Brdiczka et al. |
| 2012/0136812 A1 | 5/2012 | Brdiczka |
| 2012/0254165 A1 | 10/2012 | Brdiczka et al. |
| 2013/0006678 A1 | 1/2013 | Bellotti et al. |
| 2013/0091226 A1 | 4/2013 | Brdiczka |
| 2013/0155068 A1 | 6/2013 | Bier et al. |
| 2013/0289939 A1 | 10/2013 | Brdiczka |
| 2014/0067455 A1 | 3/2014 | Zhang et al. |
| 2014/0100952 A1 | 4/2014 | Bart et al. |
| 2014/0122383 A1 | 5/2014 | Shen et al. |
| 2014/0122483 A1 | 5/2014 | Zhang et al. |
| 2014/0163934 A1 | 6/2014 | Zhang et al. |
| 2014/0165195 A1 | 6/2014 | Brdiczka et al. |
| 2014/0181968 A1 | 6/2014 | Ge et al. |
| 2014/0245443 A1 | 8/2014 | Chakraborty |
| 2014/0278729 A1 | 9/2014 | Liu et al. |
| 2014/0317030 A1 | 10/2014 | Shen et al. |
| 2014/0324751 A1 | 10/2014 | Roberts et al. |
| 2014/0344174 A1 | 11/2014 | Ruan et al. |
| 2014/0372753 A1 | 12/2014 | DeCristofaro et al. |
| 2015/0120453 A1 | 4/2015 | Lee et al. |
| 2015/0149390 A1 | 5/2015 | Brdiczka |
| 2015/0161670 A1 | 6/2015 | Shen et al. |
| 2015/0170295 A1 | 6/2015 | Shen et al. |
| 2015/0206222 A1 | 7/2015 | Bart et al. |
| 2015/0281162 A1 | 10/2015 | Shen et al. |
| 2015/0293989 A1 | 10/2015 | Bhargava et al. |
| 2016/0078353 A1 | 3/2016 | Shen et al. |
| 2016/0182420 A1 | 6/2016 | Shen et al. |
| 2016/0182436 A1 | 6/2016 | Suzuki et al. |
| 2016/0183068 A1 | 6/2016 | Shen et al. |
| 2016/0191559 A1 | 6/2016 | Mhatre et al. |
| 2017/0147984 A1 | 5/2017 | Zoia et al. |
| 2017/0221010 A1 | 8/2017 | Brdiczka et al. |
| 2017/0228696 A1 | 8/2017 | Brdiczka et al. |
| 2017/0228697 A1 | 8/2017 | Brdiczka et al. |

OTHER PUBLICATIONS

International Preliminary Report on Patentability dated May 9, 2017 for PCT Appln. No. PCT/US15/58676.
Extended European Search Report dated Aug. 8, 2017 for EP Appin. No. 15856905.3.

\* cited by examiner

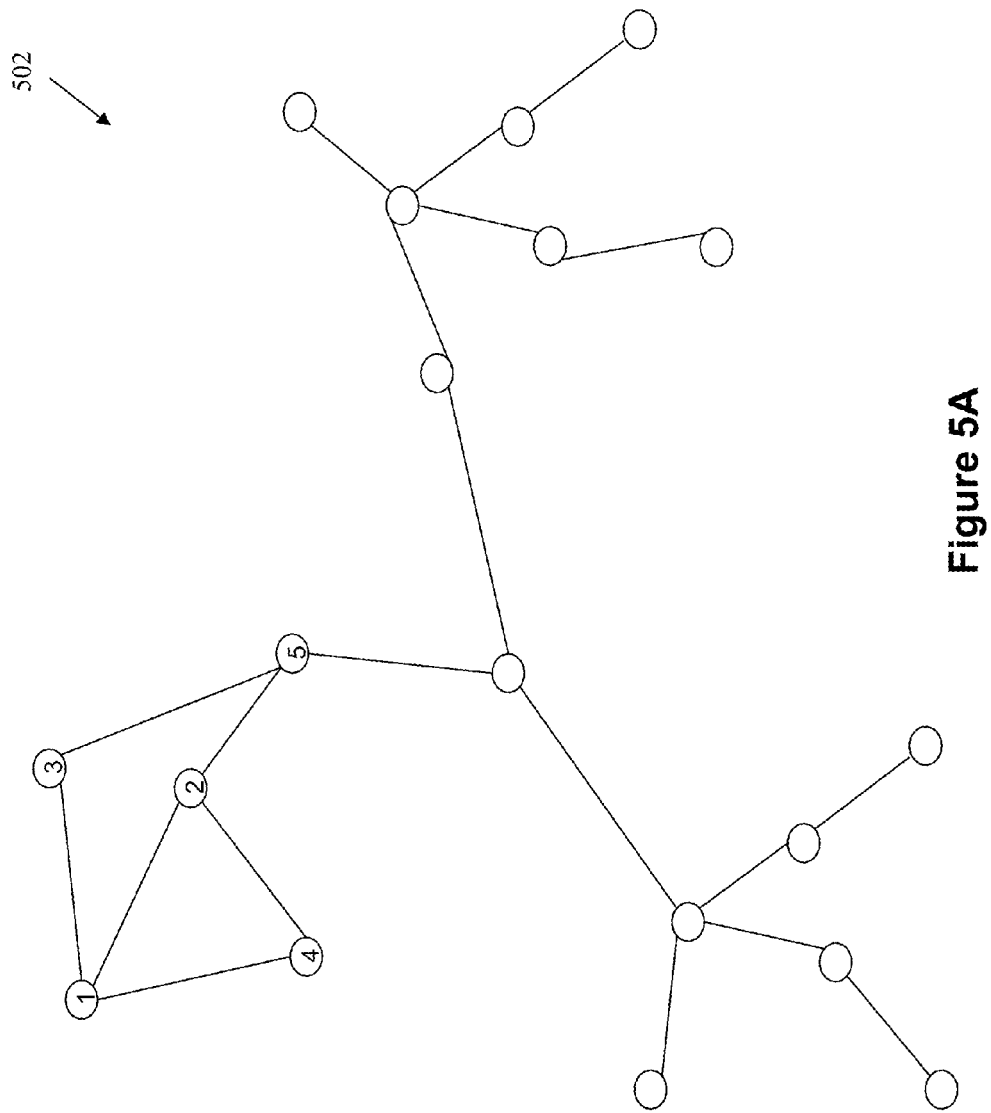

SYSTEM FOR IMPLEMENTING THREAT DETECTION USING DAILY NETWORK TRAFFIC COMMUNITY OUTLIERS

CROSS-REFERENCE TO RELATED APPLICATION(S)

The present application claims the benefit of U.S. Provisional Application Ser. No. 62/074,560, filed on Nov. 3, 2014, titled "A SYSTEM FOR IMPLEMENTING THREAT DETECTION USING DAILY NETWORK TRAFFIC COMMUNITY OUTLIERS", the content of the aforementioned application is hereby incorporated by reference in its entirety.

BACKGROUND

In recent years, it has become increasingly difficult to detect malicious activity carried on internal networks. One type of threat that has become more of an issue in recent times is the "insider" threat. This type of threat pertains to the situation when an insider (such as a company employee or contractor) performs malicious activities from inside the company firewall. This is in contrast to many types of other threats that involve attacks from external hosts originating from outside the company network. Given the extreme levels of damage that may result from malicious activities of an insider, identification of insider threat has become an important goal in the context of network security for many organizations.

However, it is very difficult to effectively detect the presence of an insider threat. By definition, perimeter solutions (firewalls or Intrusion Prevention Systems) are not deployed in a manner that allows them to detect human-driven malicious behaviors which occurs inside the network—such systems are typically oriented to the detection of threats originating from the outside of the network.

Furthermore, most IT organizations grant hosts inside their networks a very broad set of rights. The definition and detection of anomalous and ultimately malicious behavior is thus much harder. In addition, the volume of traffic moving through the inside of modern networks is substantially larger than even in the recent past, making it more difficult to assess whether any particular portion of the data conveyed is malicious, harmful, or corresponds to a security breach or threat.

A large array of sensors installed on individual hosts would be able to monitor and flag malicious behavior. However, such solutions are invasive, costly and difficult to maintain. Additionally, these solutions often operate by attempting to detect a set of known scenarios by the use of pre-programmed rules or heuristics. Therefore, one problem with this approach is that it is impossible to always know ahead of time the specific characteristics of every threat that may be carried out, and hence such systems are always playing "catch up" to the real-world threats that may actually take place.

Therefore, there is a need for an improved approach to implement insider threat detections.

SUMMARY

Embodiments of the invention provide an improved approach to implement a system and method for performing detection of insider threats. This provides a way to identify abnormal behaviors potentially leading to insider threats without the need for individual monitoring software on each host, by leveraging communication metadata to construct the internal communication graph of all active hosts.

Other additional objects, features, and advantages of the invention are described in the detailed description, figures, and claims.

BRIEF DESCRIPTION OF THE DRAWINGS

FIGS. 5A-B illustrate a connectivity graph and clusters formed within the graph.

DETAILED DESCRIPTION

The disclosed invention provides an improved approach to implement a system and method for performing the detection of insider threats. The disclosed invention provides a way to identify abnormal behaviors potentially leading to insider threats without the need for individual monitoring software on each host, by leveraging metadata that describe the internal connection patterns of all active hosts.

Being able to identify such potentially malicious insiders is extremely important in the field of network security. The potential damage to an organization from exfiltration of intellectual property or personal data, or malicious behavior that can damage an organization's infrastructure, represents an increasing concern to many organizations.

The disclosed invention provides a method and system for implementing threat detection that operates by identifying clusters of hosts (communities) built from the connectivity graph of communications within an internal network using metadata that simply describes all communication sessions. The connectivity graph and the host affiliation to a particular community enable the definition of a baseline behavior for all hosts. This baseline relies on exhibited communication behavior and connectivity inside each community and allows the detection of abnormal behavior for a given host that exhibits large deviations from the baseline. This approach allows the detection system to characterize what can be defined as normal for each entity on an organization's network, without having to install monitoring software on each and every host. As installing monitoring software on each entity is often not a possibility, the non-invasive solution of the current invention provides a very useful and efficient way to perform threat detection.

Figure 1:
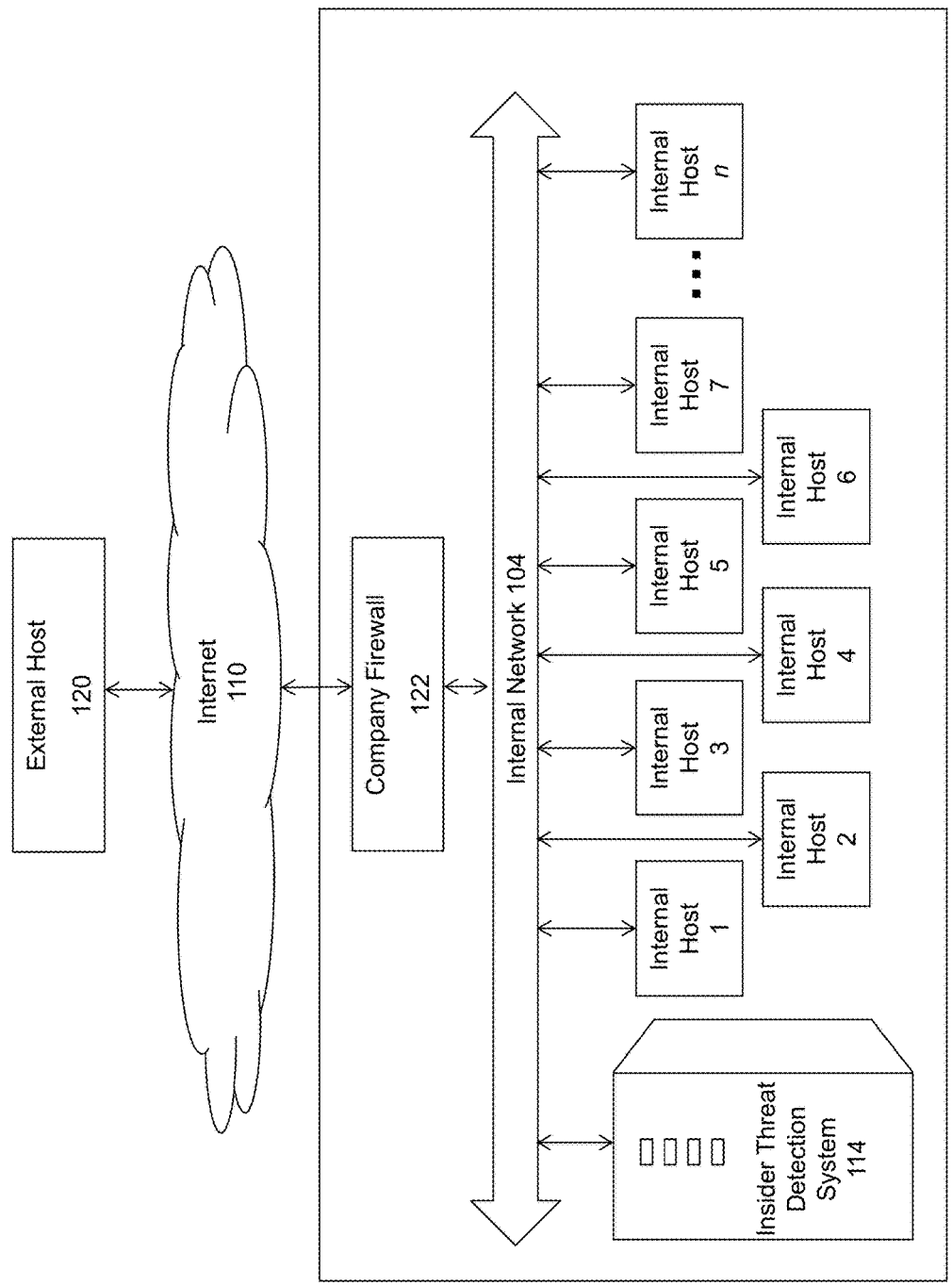
FIG. 1 illustrates how some embodiments of the invention may be implemented.

FIG. 1 illustrates how some embodiments of the invention may be implemented in many organizational networks (also referred to herein without limitation as "company networks"). The internal network infrastructure 104 carries data and communications between multiple points within the company network, including wholly internal traffic between and among internal multiple internal hosts, such as internal hosts 1, ..., n. The company network may cover multiple physical locations or may be limited to a single place like a campus network or a data center. This internal traffic usually sits behind a firewall 122, so that any external traffic is carried through the firewall 122 to the public Internet 110 to communicate with any external host 120.

An insider threat detection system 114 is provided to monitor the company network for insider threats. The detection system 114 extracts and maintains metadata across time windows to enable the formation of the internal connectivity graph, and identifies communities of hosts to build a baseline behavior pattern for each host. The system 114 compares in (near) real-time each host's communication patterns in the internal network with the baseline model for that particular host. The system can then identify significant deviation in the host's behavior and flag and report them as potential threats.

To operate, the insider threat detection system 114 receives network packets from the internal network infrastructure 104. The insider threat detection system 114 can be implemented as software that resides upon networking equipment within the network 104, such as a router or switch. The insider threat detection system 114 can also be implemented as a dedicated hardware device that monitors network traffic on the network 104. Finally, the insider threat detection system 114 can be implemented in a virtual machine and be deployed on hardware supplied by the company that owns the network.

The insider threat detection system 114 receives packets that are sent within the network, and processes them through a detection algorithm in order to identify and isolate potentially malicious behavior. In some embodiments, the system 114 only monitors internal traffic on network 104 to check for insider threats, and ignores any traffic to/from external hosts 120.

Network packets arrive at the system 114 from, for example, a SPAN (Switched Port ANalyzer) port or a TAP (Test Access Point) port. The system passively accepts traffic from one or more such ports and processes using a flow engine. The flow engine organizes the received packets into unidirectional flows of traffic from a single source to a single destination, though the destination may be a multicast or broadcast address, thus potentially arriving at multiple recipients. In an IP network (which this system is illustratively though not exclusively concerned with), a flow is minimally identified by at least a source address and a destination address. Some protocols (e.g., UDP and TCP) further support the concept of a source port and a destination port, thus leading to the common use of a five tuple that includes this information to identify a flow.

The insider threat detection system 114 may include a processing engine to process the incoming packets, and to check the network traffic for anomalies worth reporting. A detection algorithm (described in more detail further below) is used to perform these checks. Further details of an example approach that can be taken to implement a processing engine is described in U.S. Non-Provisional application Ser. No. 14/643,931, titled "A SYSTEM AND METHOD FOR DETECTING INTRUSIONS THROUGH REAL-TIME PROCESSING OF TRAFFIC WITH EXTENSIVE HISTORICAL PERSPECTIVE", filed on Mar. 10, 2015, which is hereby incorporated by reference in its entirety.

Detected threats can be stored into a threat database. The threat database includes the information about detections of potentially malicious behavior as well as information about the hosts to which those behaviors are attributed. In some embodiments, the captured information may pertain to specific users that correspond to the malicious behavior, if a correlation can be made between individuals/users and the hosts.

Figure 2:
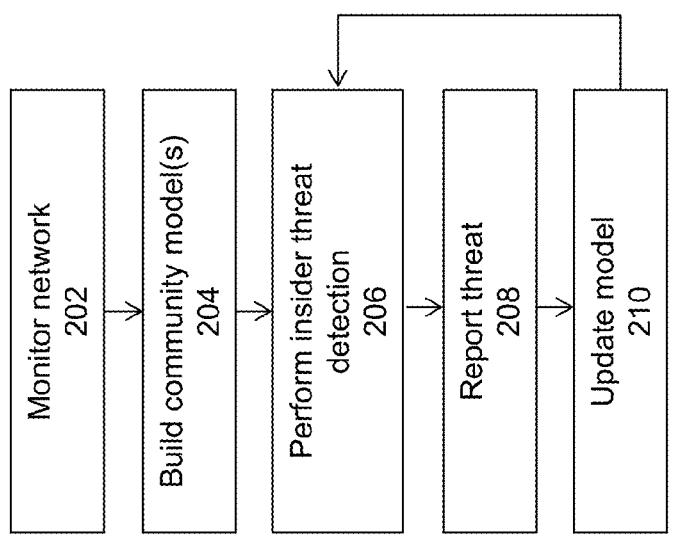
FIG. 2 shows a flowchart of an approach to perform insider threat detection according to some embodiments of the invention.

FIG. 2 shows a flowchart of an approach to perform insider threat detection according to some embodiments of the invention. At 202, the company network is monitored for network traffic. As noted above, only internal network traffic needs to be monitored in some embodiments to perform this particular type of insider threat detection. Therefore, traffic to/from external locations are not currently being monitored.

At 204, one or more models of the host communities are constructed. Hosts/users within the internal company network are analyzed to determine their memberships within different communities within the company. The idea is that the behavior of users/hosts within the company can be monitored to identify specific groups to which they belong.

For example, based upon their day-to-day activities, it is possible to detect that certain hosts/users belong to a community of finance employees, especially if these finance employees have a common set of activities that they all regularly perform, e.g., accessing a finance/accounting server or printing to a specific printer in the finance department. As another example, a community of engineers can possibly be identified by determining that they all regularly access a set of software code servers (e.g., to check in/out code versions).

The key is that the system is not pre-programming hosts/users into the different community groups. Instead, by tracking network behaviors over a certain time period (e.g., in a 24 hour period or one week period), machine learning can be performed to identify communities and host membership in a dynamic manner. This removes any need to make pre-assumptions about host memberships that may end up being erroneous, and permits the memberships to be updated based upon user/host behaviors.

At 206, once a membership model has been built for the network, insider threat detection is then performed by monitoring network behaviors that are suspicious in light of the host/users current membership in a given community. For example, if a given host is historically found to be a member of the finance community, then a threat alert may need to be given if that host suddenly starts to access the code server that is usually accessed only by engineers and downloads a substantial quantity of data from that code server.

At 208, any threats that are detected are placed into a threat database. In addition, an alert can be provided to appropriate personnel (e.g., system administrators) regarding the threat. A combination of several detected threats into narratives or threat scenarios that describe specific, potentially novel threat behaviors is possible.

One of the benefits of the current approach is that the community models can be updated to reflect changing roles or conditions in the network. Therefore, at 210, information gathered from monitoring the network can be used to update the community models. One possible approach is to use the information gathered from a 24 hour period to create a community model. The information gathered in a subsequent 24 hour period is used to both perform threat detection and to update the previously determined community model. Another approach is to implement a sliding overlapping window for the monitoring, where additional monitoring incrementally updates the community model.

Figure 3:
FIG. 3 shows a more detailed flowchart of an approach to construct the community model according to some embodiments of the invention.

FIG. 3 shows a more detailed flowchart of an approach to construct the community model according to some embodiments of the invention. At 300, internal network traffic is collected to construct the model.

At 302, metadata is extracted from the collected traffic. Each communication session within an organization internal network results in the creation of a set of metadata that contains information including, but not limited to, source and destination host, destination port, number of connection attempts, size of data exchanged, duration and time of the communication. An initial filtering phase also discards communication sessions of no possible interest.

Next, at 304, the metadata is maintained across time window(s). Each session of interest is preserved for a given time window and the aggregated data is used at 306 to build a connectivity graph (referred to as the internal social network graph). The internal social network graph is used at 308 to identify clusters of hosts (communities) that are characterized by similar behavior. Examples of approaches that can be taken to build the communities include the Louvain, Leading Eigenvector, and MultiLevel algorithms. For each host a baseline behavior pattern is extracted based on its established community affiliation.

Figure 4:
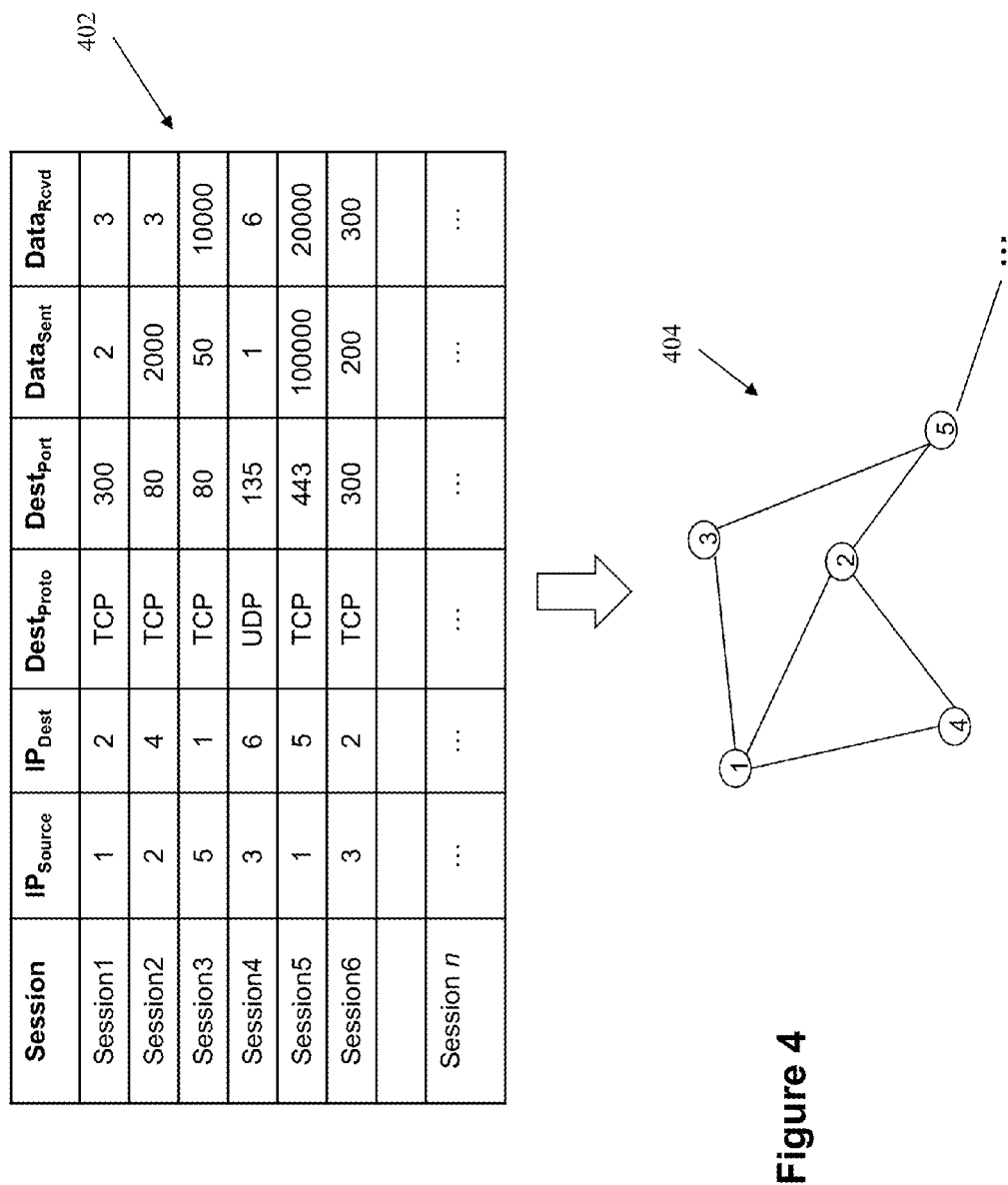
FIG. 4 shows an example set of metadata that is extracted for network traffic on a company internal network.

To illustrate this process, FIG. 4 shows an example set of metadata 402 that is extracted for network traffic on a company's internal network. The metadata 402 includes, for example, data regarding the connections' source and destination IP addresses, protocols, destination port numbers, and the size of the data exchanged between source and destination hosts.

This metadata is used to construct a connectivity graph 404. Each node within graph 404 corresponds to an internal host which has been tracked as communicating with another internal host on the network. The edges within the graph 404 correspond to "meaningful" communications between the hosts. Any suitable criteria can be used to determine which communications are meaningful enough to be represented in graph 404. For example, the following are some examples of approaches that can be considered: (a) quantity of data; (b) number of communication attempts; (c) ratio of sent/received data; (d) communications frequency; (d) destination ports used for the communication; or (e) any combination of the preceding factors. The edges can be weighted to represent relative differences in the amounts of communications between the different hosts.

Figure 5B:
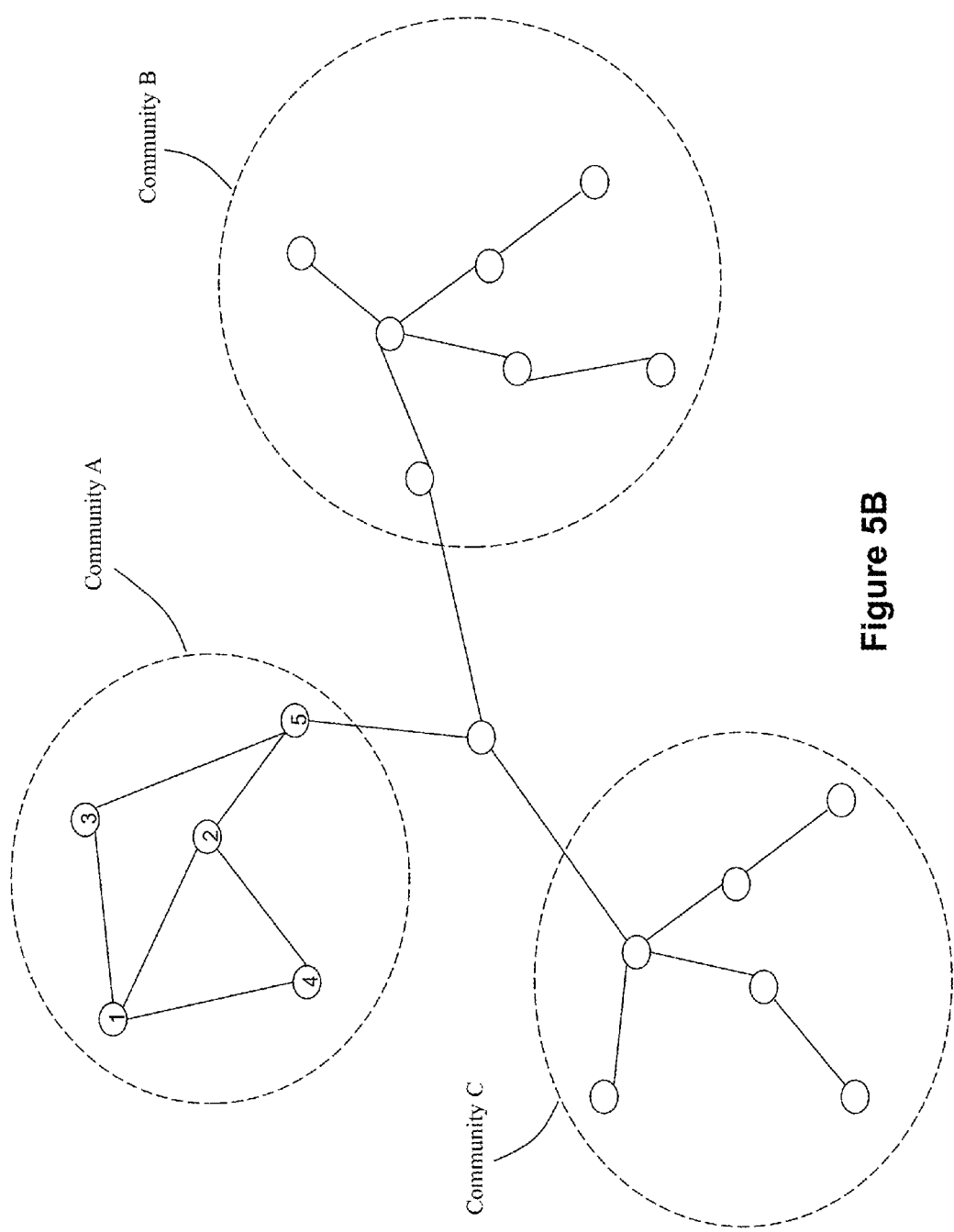

Once the internal social network graph has been constructed, the graphs can be analyzed to identify clusters of hosts that should be grouped into communities having similar behaviors. FIG. 5A shows an example network graph 502 that may be constructed from network behaviors. FIG. 5B illustrates the results of performing clustering upon the graph 502. It can be seen that the nodes in the graph 502 have been organized into three clusters, representing Community A, Community B, and Community C. Any suitable approach can be taken to cluster the nodes in the graph. As noted above, examples approaches that can be taken to cluster the nodes into communities include the Louvain, Leading Eigenvector, and MultiLevel algorithms.

Once the baseline connectivity graph model has been constructed, malicious insider activity within an organization's internal network can be identified by checking for abnormal behavior with respect to that baseline connectivity graph model.

Figure 6:
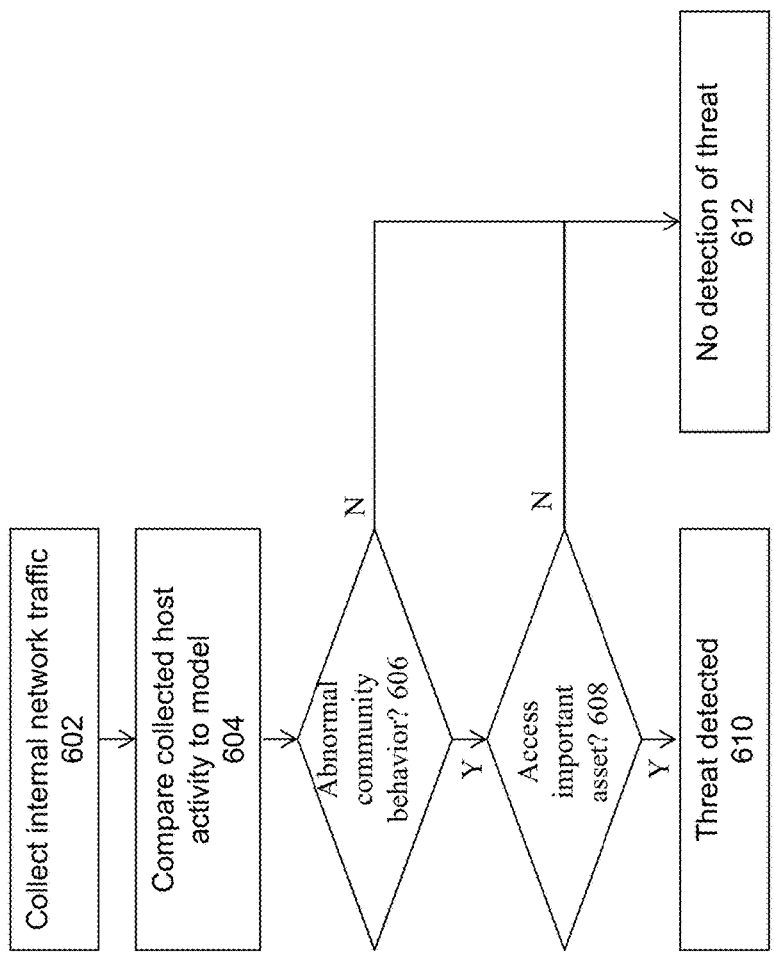
FIG. 6 shows a flowchart of an approach that can be taken to check for this abnormal behavior.

FIG. 6 shows a flowchart of an approach that can be taken to check for this abnormal behavior. At 602, internal network traffic is collected. This data is collected over a subsequent time period from the time period used to construct the earlier graph model.

At 604, a comparison is made between the data for the newly collected host activity and the previous host activity. A determination is made at 606 whether the data for the newly collected activities indicates abnormal behavior. One or more threshold levels can be established to numerically identify whether the behavior can be classified as being abnormal. For example, one possible approach that can be taken is to monitor for a given host (e.g., host 1), and to determine whether the percentage of new hosts being accessed by host 1 in the new time frame exceeds a certain number/percentage as compared to the baseline model computed in an earlier time frame. If so, then this can be used an indication of abnormal behavior.

To reduce noise and to provide greater confidence in the threat detection results, additional (optional) checks can be made to confirm the existence of a threat. For example, an additional check can be made to determine whether the host has attempted to access an important asset within the company network that it had not previously accessed. Such important assets may include, for example, servers that contain sensitive information, trade secrets, or confidential intellectual property.

Therefore, at 608, an additional determination is made whether the host has attempted to access an important asset. If not, then at 612 this provides an indication that an insider threat has not been detected. However, if the abnormal behavior is confirmed, then the insider threat is detected and can be reported at 610.

This approach permits the system to flag as anomalous behavior an aggregate of communication sessions for a given host that shows a significant deviation from the host's baseline. This could be triggered by, for example, a significant shift in the first-degree (direct) connections of a given host, or the observation of a previously unobserved connection pattern involving a high degree of separation in the host-centered connectivity graph.

Figure 7A:
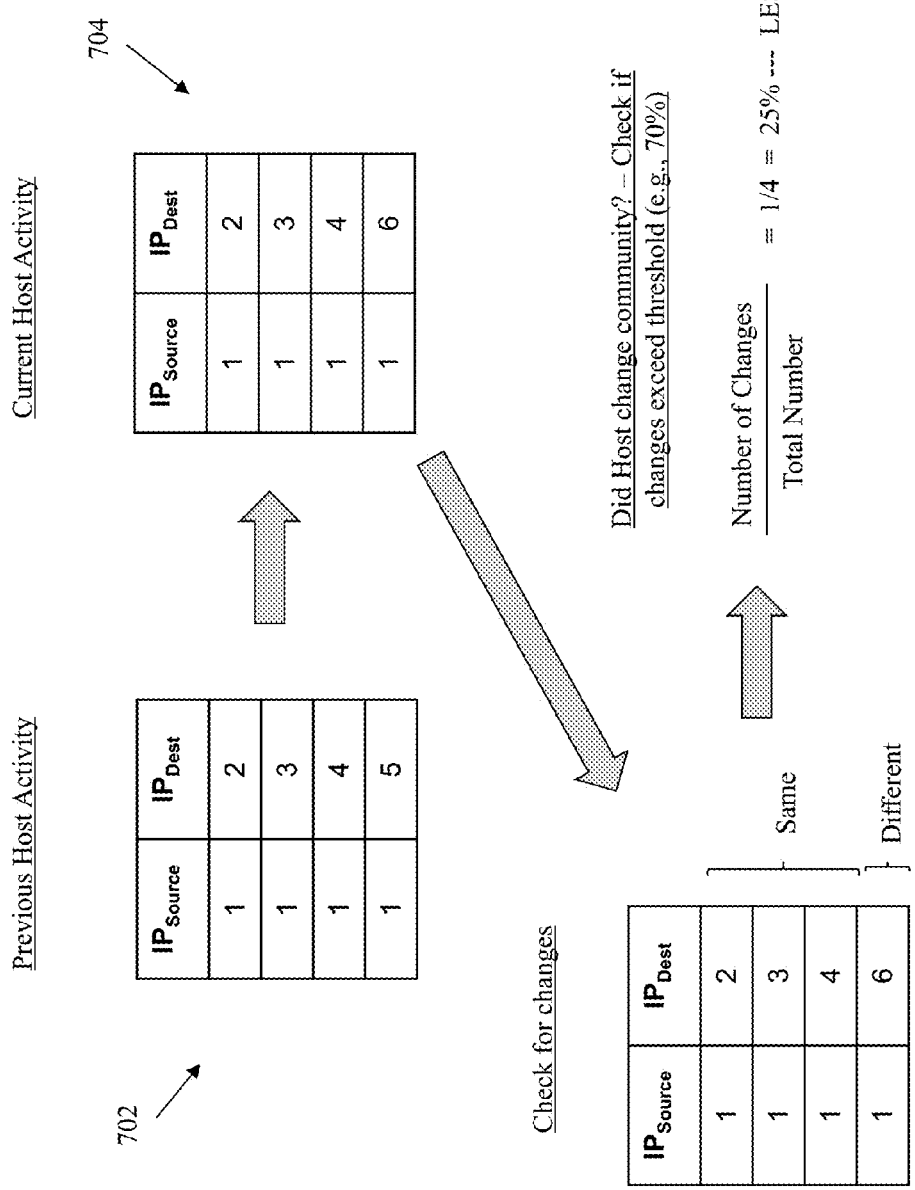
FIGS. 7A-C illustrate detection of abnormal behavior.

FIG. 7A provides an illustration of this process. Chart 702 shows a very simple example of data that represents the baseline behavior pattern for host 1 that was extracted from this host's past network activity. This chart shows which other hosts have been contacted by this host in the previous baseline time period. As should be clear, any behavior data may be used to represent the past behavior, e.g., including amount of transferred data, frequency of contact, etc.

Chart 704 represents the current activity for this host in the newly monitored time period. For the sake of illustration, only the destinations contacted by host 1 are shown in this chart. As noted above, other types of data may be used in other embodiments of the invention.

A comparison is performed to check for the presence of abnormal behavior. In the present example, a determination is made of the differences between the hosts that have been contacted in the current time period as compared to the prior baseline time period. Here, it can be seen that in the currently monitored activity, the host has contacted three hosts that were also contacted in the earlier baseline time period (e.g., hosts 2, 3, and 4). However, one host contacted in the current time period differs from the set of hosts that were contacted in the earlier baseline time period (e.g., host 6).

A determination is made whether the differences are large enough to be seen as "abnormal". A threshold difference level may be established to make this determination. For example, a threshold difference ratio of 70% may be established to make this determination.

Here, the total number of changed hosts is one (host 6). The total number of hosts that were contacted is four (hosts 2, 3, 4, and 6). Therefore, the ratio of the changed number of hosts to the total number of contacted hosts is ($\frac{1}{4}$) which is 25%. Since this percentage is smaller than the threshold of 70%, this means that the behavior does not rise to the level of being abnormal.

Figure 7B:
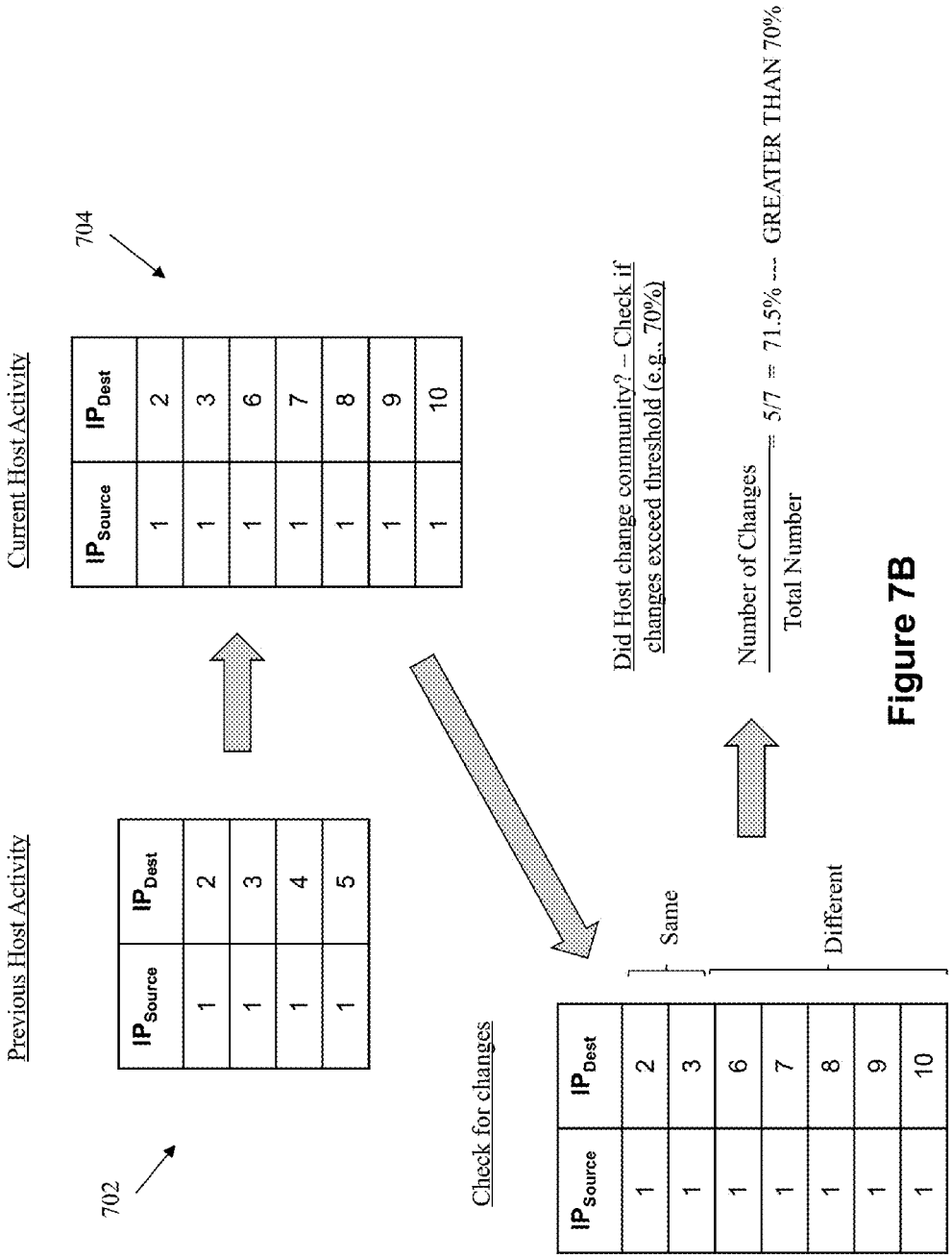

FIG. 7B shows another example situation. As before, chart 702 shows a very simple example of data that represents the baseline behavior pattern for host 1 that was extracted based on this host's past behavior. Chart 704 represents the current activity for this host in the newly monitored time period.

A comparison is performed to check for the presence of abnormal behavior, by determining the differences between the hosts that have been contacted in the current time period as compared to the prior baseline time period. Unlike the previous example, it can be seen that in the currently monitored activity the host has contacted numerous hosts that were not also contacted in the earlier baseline time period (e.g., hosts 6, 7, 8, 9, and 10). Two hosts contacted in the current time period were already contacted in the earlier baseline time period (e.g., hosts 2 and 3).

A determination is made whether the differences is sufficiently material enough to be seen as abnormal, using the same threshold difference levels that were used in the previous example (e.g., 70%).

Here, the total number of changed hosts is five (hosts 6, 7, 8, 9, and 10). The total number of hosts that were contacted is seven (hosts 2, 3, 4, 6, 7, 8, 9, and 10). Therefore, the ratio of the changed number of hosts to the total number of contacted hosts is ($5/7$) which is 71.5%. Since this percentage is greater than the threshold of 70%, this indicates that the behavior may rise to the level of being abnormal.

The next action is to therefore check whether an important asset was contacted by the host during the new monitored time period. For example, if any of the newly contacted hosts in chart 704 (e.g., hosts 6, 7, 8, 9, or 10) is an important asset, then this confirms that the host has engaged in abnormal behavior sufficient to warrant an indication of significant deviation from the host's baseline, and hence to be flagged as anomalous behavior.

It is noted that not all hosts need to be treated equally in the above analysis. In fact, weighting may be applied to treat certain hosts differently (and more/less importantly) from other hosts. To explain, consider the example of FIG. 7C. This example is very similar to the situation shown in FIG. 7A, where only a small number of new hosts (hosts 10 and 11) have been contacted as compared to the earlier baseline time period. In the example of FIG. 7A, all hosts were equally weighted, and hence the ratio of the changed number of hosts to the total number of contacted hosts was ($1/4$) which equals 25% and is smaller than the threshold of 70% indicating that the behavior does not rise to the level of being abnormal.

Figure 7C:
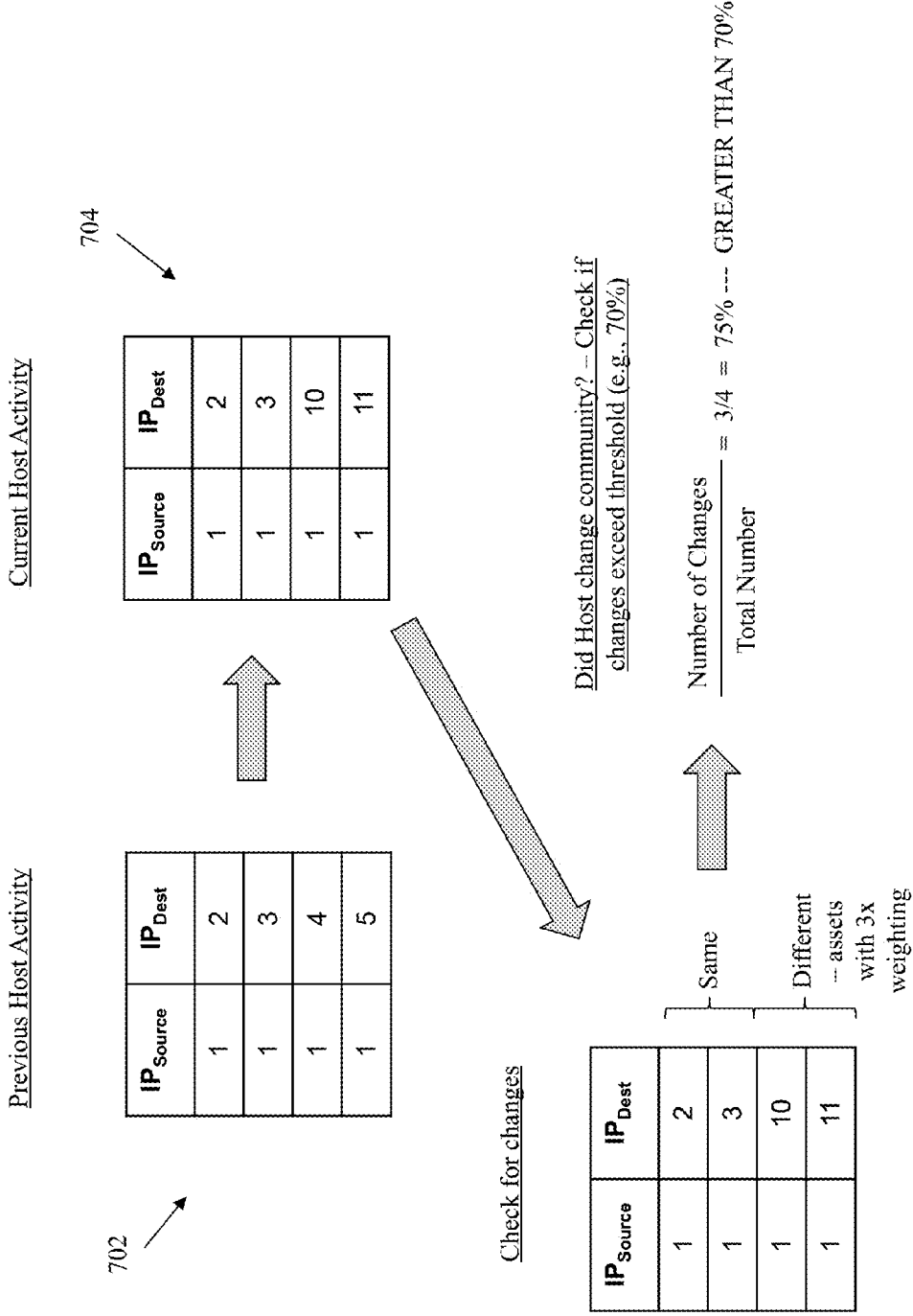

However, in the example of FIG. 7C, the new hosts may be important or sensitive enough to warrant additional weighting factors, e.g., to be associated with a 3×weighting. Higher weight can typically be associated to servers or important assets in the network. As another example, the quantity of transferred data may be used to determine the weightings (e.g., weighting of 3×due to a large amount of transferred data between host 1 and host 11). In this situation, the total number of changed hosts is only two (hosts 10 and 11). However, since 3×weighting is applied the calculations will nonetheless assume that the total of changed hosts is 6 (two changed hosts multiplied by 3). The total number of hosts that were contacted is eight (hosts 2, 3 plus 3 times for each of host 10 and 11). Therefore, the ratio of the changed number of hosts to the total number of contacted hosts is ($6/8$) which is 75%. Since this percentage is greater than the threshold of 70%, this indicates that the behavior may rise to the level of being abnormal. If the list of contacted hosts includes an important asset, then this confirms that the host has engaged in abnormal behavior sufficient to warrant an indication of significant deviation from the host's baseline, and hence to be flagged as anomalous behavior.

In some embodiments, the above approach to perform threat detections can be performed in near real-time. This approach is taken to look for behavior which can be recognized by looking at multiple sessions over some span of time. The algorithms process sessions and individually decide whether to ignore them (if they are not of interest), to accumulate statistics about them (if they are of interest, but the threshold set for this type of detection has not been reached) or to signal a detection (if the collected stats have crossed the threshold). Each near-real-time processing algorithm accumulates short-term state as it is looking to detect sustained behavior of a particular kind by a particular host. The accumulated data will be used to update the model and create the new baseline host behavior, as often as configured in some embodiments of the invention.

The near-real-time detection algorithm performs stateful processing in the sense that it encounters multiple sessions attributed to a specific host in a certain window of time in order to decide whether the collection of sessions is signaling malicious behavior or not.

Therefore, what has been described is an inventive method and system for identifying insider threats within an organization by leveraging the evolution of the internal connectivity graph over time. Such capability provides significant aid to information security professionals in the identification of malicious users who could damage an organization by compromising assets in the internal network and stealing intellectual property or sensitive data, or destroying infrastructure.

The above approach provides multiple benefits for the identification of insider threats, including removal of the need for sensors on each host that would independently monitor the host's activity. In addition, the invention easily and effectively defines a baseline behavior for all hosts based on a limited set of metadata. The approach allows the identification in near real-time of abnormal behavior as deviation from the baseline. The invention can be used to provide a view of the internal network through the identification of host communities. In addition, the invention can automatically adjust and adapt to each network it encounters.

It is noted that the inventive concepts disclosed herein are not limited in their application only to the insider threat scenario. The invention is applicable to any scenario involving a possible threat from a host on an internal network, even if the controlling source of the threat is not an "insider". For example, consider the situation where a machine on an internal network is behaving outside the baseline of its normal behavior, but is doing so at the behest of an outside attacker who has taken over the machine by installing some malware. The above-described detection mechanisms can be used to detect this type of threat, even if it involves an "outsider" rather than an "insider" that operates the host in a malicious manner.

System Architecture Overview

Figure 8:
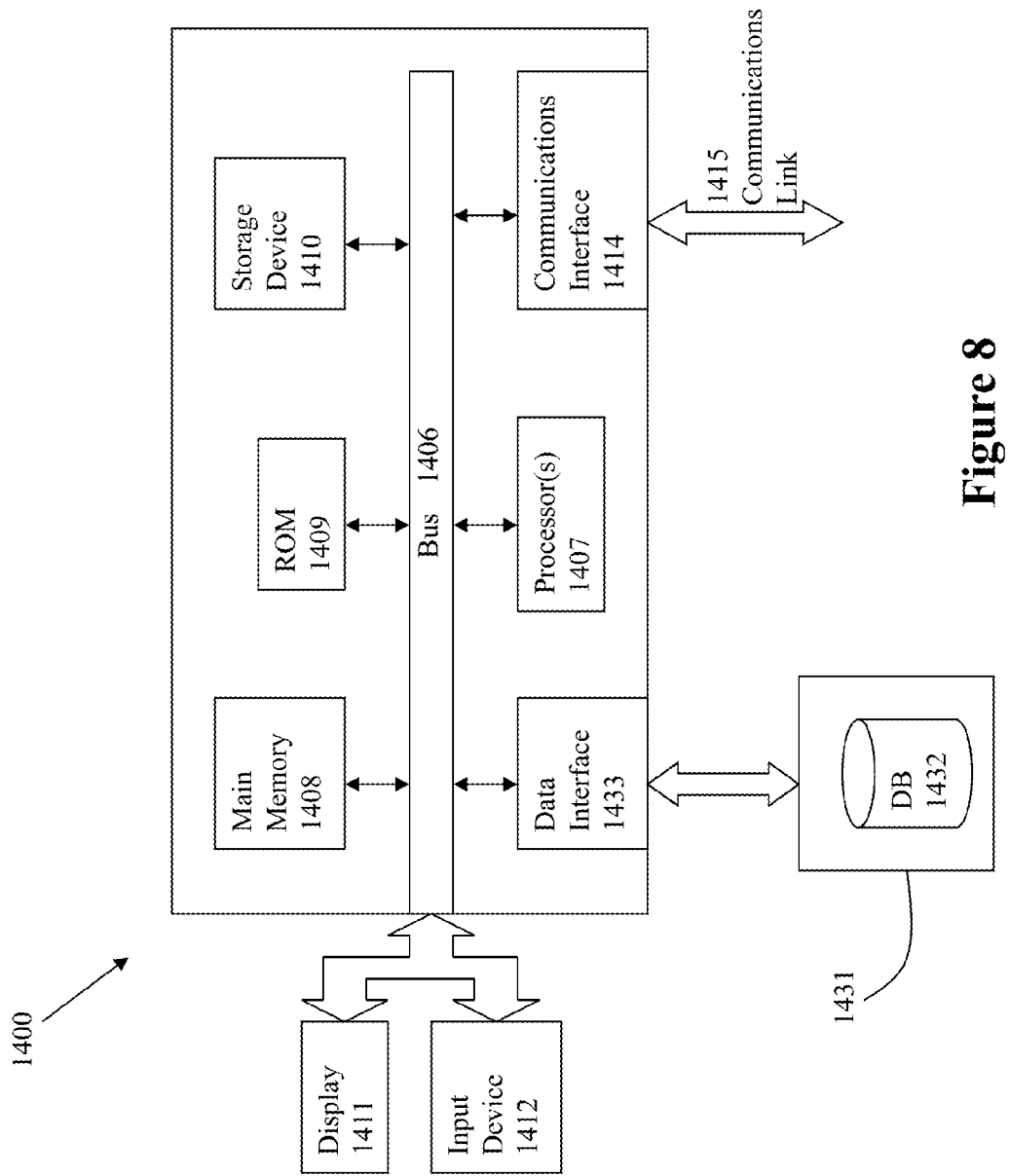
FIG. 8 depicts a computerized system on which an embodiment of the invention can be implemented.

FIG. 8 is a block diagram of an illustrative computing system 1400 suitable for implementing an embodiment of the present invention for performing intrusion detection. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method for performing threat detection in a network comprising:

monitoring communications traffic in an internal network;

constructing a graph model that represents communities of hosts within the internal network, the communities comprising a first community and a second community, the first community having a first set of hosts that access a first set of internal network resources, the second community having a second set of hosts that access a second set of internal network resources, wherein the first community comprises a different set of hosts as compared to the second community;

tracking ongoing communications and comparing against data corresponding to the communities to identify abnormal behavior, wherein the abnormal behavior corresponds to communications that are greater than a threshold amount between (a) a host from the first community corresponding to the first set of internal network resources and (b) the second set of internal network resources within the second community; and reporting a threat if the abnormal behavior is identified.

2. The method of claim 1, further comprising checking whether the host has accessed an identified asset in making a determination of the abnormal behavior, wherein the identified asset is identified for its importance or association with sensitive information.

3. The method of claim 1, wherein the graph model is constructed using a method comprising:

extracting metadata from the communications traffic;

maintaining the metadata across a time window;

constructing an activity graph using the metadata for the time window, the activity graph comprising a plurality of nodes; and deriving communities by applying clustering methods to the plurality of nodes within the activity graph.

4. The method of claim 3, wherein the metadata comprises some or all of source host identification, destination host identification, protocol information, port information, time, date, number of communication attempts, amount of data received, or amount of data sent.

5. The method of claim 3, wherein the plurality of nodes in the activity graph correspond to hosts and edges in the activity graph correspond to meaningful communications between the hosts.

6. The method of claim 3, wherein edges in the activity graph are weighted to correspond to values of the metadata or aggregated values of the metadata.

7. The method of claim 1, wherein a determination of whether the abnormal behavior corresponds to communications by the host with other hosts beyond its determined community by an amount greater than a certain threshold is performed by identifying a number of changed hosts communicating with the host and calculating a ratio of the changed hosts communicating with the host to a total number of the hosts that communicated with the host, and comparing the ratio to a threshold ratio.

8. The method of claim 1, wherein weightings are applied to changed hosts in calculating whether the abnormal behavior corresponds to communications by the host with other hosts beyond its determined community by an amount greater than a certain threshold.

9. The method of claim 1, wherein multiple sessions are attributed to the host in a certain time window to check for abnormal behavior.

10. The method of claim 1, wherein the communications traffic in the network that is monitored corresponds only to internal network traffic, and the threat corresponds to an insider threat.

11. A computer program product embodied on a non-transitory computer readable medium, the non-transitory computer readable medium having stored thereon a sequence of instructions which, when executed by a processor causes the processor to execute a method for performing a process to perform threat detection in a network, the process comprising:
monitoring communications traffic in an internal network;
constructing a graph model that represents communities of hosts within the internal network, the communities comprising a first community and a second community, the first community having a first set of hosts that access a first set of internal network resources, the second community having a second set of hosts that access a second set of internal network resources, wherein the first community comprises a different set of hosts as compared to the second community;
tracking ongoing communications and comparing against data corresponding to the communities to identify abnormal behavior, wherein the abnormal behavior corresponds to communications that are greater than a threshold amount between (a) a host from the first community corresponding to the first set of internal network resources and (b) the second set of internal network resources within the second community; and
reporting a threat if the abnormal behavior is identified.

12. The computer program product of claim 11, further comprising checking whether the host has accessed an identified asset in making a determination of the abnormal behavior, wherein the identified asset is identified for its importance or association with sensitive information.

13. The computer program product of claim 11, wherein the graph model is constructed using a method comprising:
extracting metadata from the communications traffic;
maintaining the metadata across a time window;
constructing an activity graph using the metadata for the time window, the activity graph comprising a plurality of nodes; and
deriving communities by applying clustering methods to the plurality of nodes within the activity graph.

14. The computer program product of claim 13, wherein the metadata comprises some or all of source host identification, destination host identification, port information, time, date, number of communication attempts, amount of data received, or amount of data sent.

15. The computer program product of claim 13, wherein the plurality of nodes in the activity graph correspond to hosts and edges in the activity graph correspond to meaningful communications between the hosts.

16. The computer program product of claim 13, wherein edges in the activity graph are weighted to correspond to values of the metadata or aggregated values of the metadata.

17. The computer program product of claim 11, wherein a determination of whether the abnormal behavior corresponds to communications by the host with other hosts beyond its determined community by an amount greater than a certain threshold is performed by identifying a number of changed hosts communicating with the host and calculating a ratio of the changed hosts communicating with the host to a total number of the hosts that communicated with the host, and comparing the ratio to a threshold ratio.

18. The computer program product of claim 11, wherein weightings are applied to changed hosts in calculating whether the abnormal behavior corresponds to communications by the host with other hosts beyond its determined community by an amount greater than a certain threshold.

19. The computer program product of claim 11, wherein near wherein multiple sessions are attributed to the host in a certain time window to check for abnormal behavior.

20. The computer program product of claim 11, wherein the communications traffic in the network that is monitored corresponds only to internal network traffic, and the threat corresponds to an insider threat.

21. A system, comprising:
a computer processor to execute a set of program code instructions;
a memory to hold the program code instructions, in which the program code instructions comprises program code to perform monitoring communications traffic in an internal network;
constructing a graph model that represents communities of hosts within the internal network, the communities comprising a first community and a second community, the first community having a first set of hosts that access a first set of internal network resources, the second community having a second set of hosts that access a second set of internal network resources, wherein the first community comprises a different set of hosts as compared to the second community;
tracking ongoing communications and comparing against data corresponding to the communities to identify abnormal behavior, wherein the abnormal behavior corresponds to communications that are greater than a threshold amount between (a) a host from the first community corresponding to the first set of internal network resources and (b) the second set of internal network resources within the second community; and
reporting a threat if the abnormal behavior is identified.

22. The system of claim 21, wherein the program code instructions further comprises program code to perform checking whether the host has accessed an identified asset in making a determination of the abnormal behavior, wherein the identified asset is identified for its importance or association with sensitive information.

23. The system of claim 21, wherein the program code instructions further comprises program code to construct the graph model comprising: extracting metadata from the communications traffic; maintaining the metadata across a time window; constructing an activity graph using the metadata for the time window; and clustering nodes within the activity graph.

24. The system of claim 23, wherein the metadata comprises some or all of source host identification, destination host identification, port information, time, date, amount of data received, number of communication attempts, or amount of data sent.

25. The system of claim 23, wherein the nodes in the activity graph correspond to hosts and edges in the activity graph correspond to meaningful communications between the hosts.

26. The system of claim 23, wherein edges in the activity graph are weighted to correspond to values of the metadata or aggregated values of the metadata.

27. The system of claim 21, wherein a determination of whether the abnormal behavior corresponds to communications by the host with other hosts beyond its determined community by an amount greater than a certain threshold is performed by identifying a number of changed hosts communicating with the host and calculating a ratio of the changed hosts communicating with the host to a total number of the hosts that communicated with the host, and comparing the ratio to a threshold ratio.

28. The system of claim 21, wherein weightings are applied in calculating whether the abnormal behavior corresponds to communications by the host with other hosts beyond its determined community by an amount greater than a certain threshold.

29. The system of claim 21, wherein multiple sessions are attributed to the host in a certain time window to check for abnormal behavior.

30. The system of claim 21, wherein the communications traffic in the network that is monitored corresponds only to internal network traffic, and the threat corresponds to an insider threat.

* * * * *